(12) United States Patent
Behbehani

(10) Patent No.: US 8,533,995 B1
(45) Date of Patent: Sep. 17, 2013

(54) AUTOMATIC WATERING DEVICE FOR PLANTS

(71) Applicant: Fawzi Q. M. A. O. A. Behbehani, Salwa (KW)

(72) Inventor: Fawzi Q. M. A. O. A. Behbehani, Salwa (KW)

( * ) Notice: Subject to any disclaimer, the term of this patent is extended or adjusted under 35 U.S.C. 154(b) by 0 days.

(21) Appl. No.: 13/760,008

(22) Filed: Feb. 5, 2013

(51) Int. Cl.
*A01G 25/00* (2006.01)

(52) U.S. Cl.
USPC ................................. 47/79; 47/48.5

(58) Field of Classification Search
USPC ................. 47/66.6, 79, 48.5, 82; 222/67, 68, 222/69, 64, 181.1; 137/416, 429, 430, 433; 251/65
See application file for complete search history.

(56) References Cited

U.S. PATENT DOCUMENTS

| 3,174,496 | A |   | 3/1965 | Hoeppel |   |
|---|---|---|---|---|---|
| 4,092,802 | A | * | 6/1978 | Oyama | ............................. 47/16 |
| 4,557,071 | A |   | 12/1985 | Fah |   |
| 4,829,708 | A | * | 5/1989 | Gonzalez | .......................... 47/39 |
| 5,020,261 | A |   | 6/1991 | Lishman |   |
| 5,176,167 | A | * | 1/1993 | Tiao | ............................... 137/423 |
| 5,193,570 | A |   | 3/1993 | Mott |   |
| 5,351,437 | A |   | 10/1994 | Lishman |   |
| 5,671,562 | A | * | 9/1997 | Fah | .................................... 47/79 |
| 2002/0184819 | A1 | * | 12/2002 | Huang | ........................... 47/48.5 |
| 2007/0267515 | A1 |   | 11/2007 | Sargent |   |
| 2009/0178335 | A1 |   | 7/2009 | McKenna |   |
| 2010/0024295 | A1 | * | 2/2010 | Murray | ......................... 47/48.5 |

FOREIGN PATENT DOCUMENTS

EP 532947 3/1993

* cited by examiner

*Primary Examiner* — Rob Swiatek
*Assistant Examiner* — Lisa Tsang
(74) *Attorney, Agent, or Firm* — Richard C. Litman

(57) ABSTRACT

The automatic watering device for plants is placed in the soil of a potted plant. A float is housed in an outer chamber. The float has a ferrous metal contact at each end, with and the chamber has magnets at each end. The chamber top has a water inlet. The upper end of the float has a shutoff valve. The lower end of the chamber has a calibrated orifice for water dispensing. A water supply is connected to the chamber inlet. The water eventually provides sufficient buoyancy to the float to release it from its lower magnet and rise for attachment to the upper magnet, thereby shutting off the water inflow. Water continues to seep from the lower orifice until the level drops within the chamber to a point sufficient to cause the float to to drop from its upper magnet, allowing the water to again flow into the chamber.

20 Claims, 4 Drawing Sheets

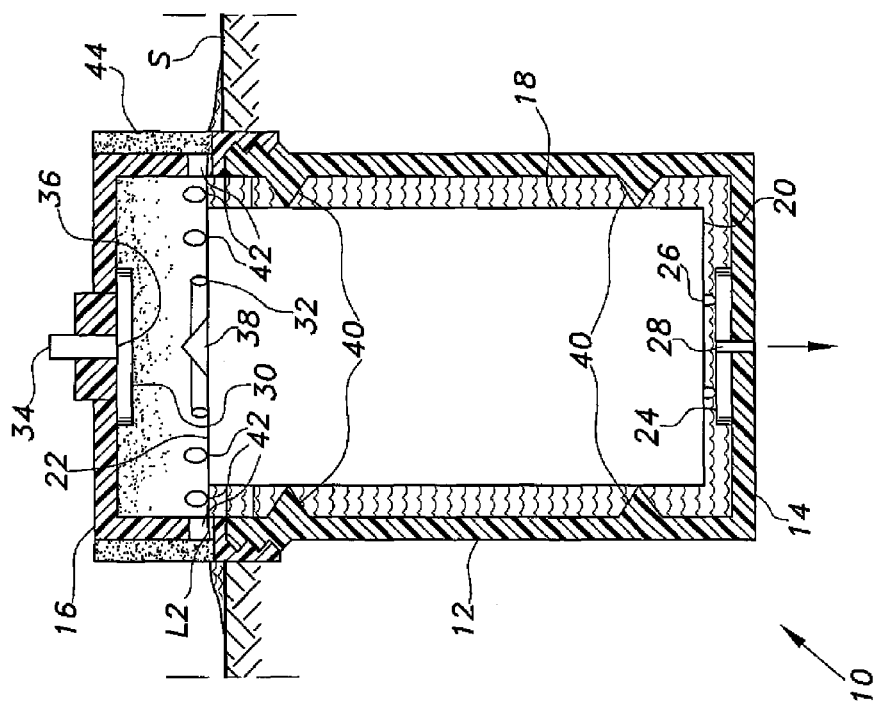
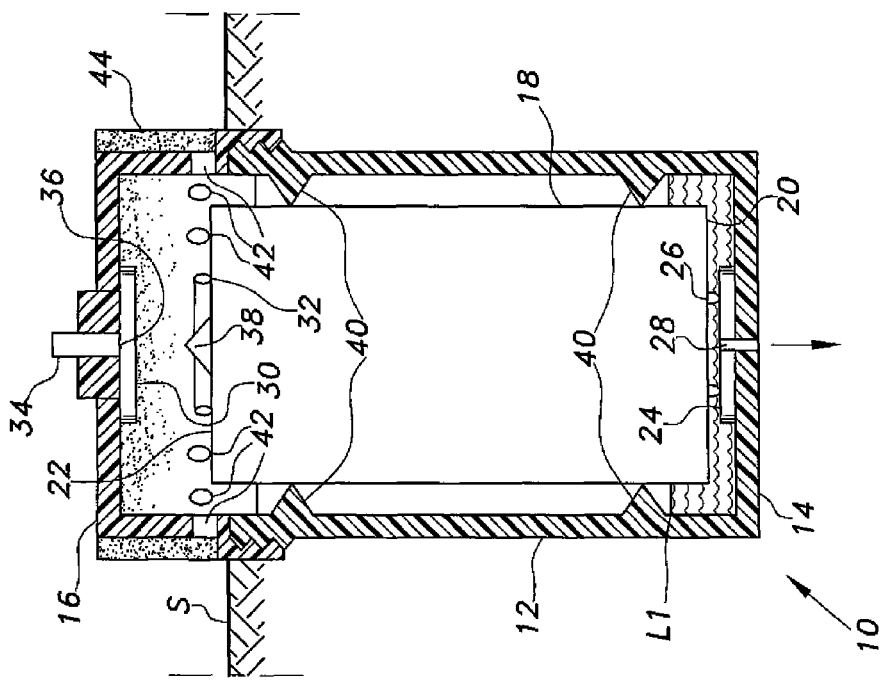

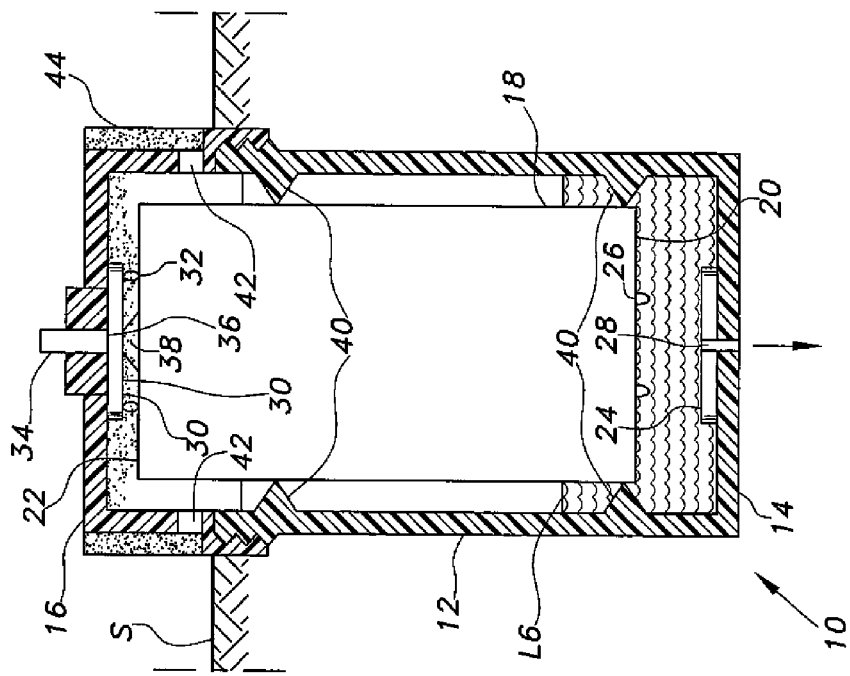
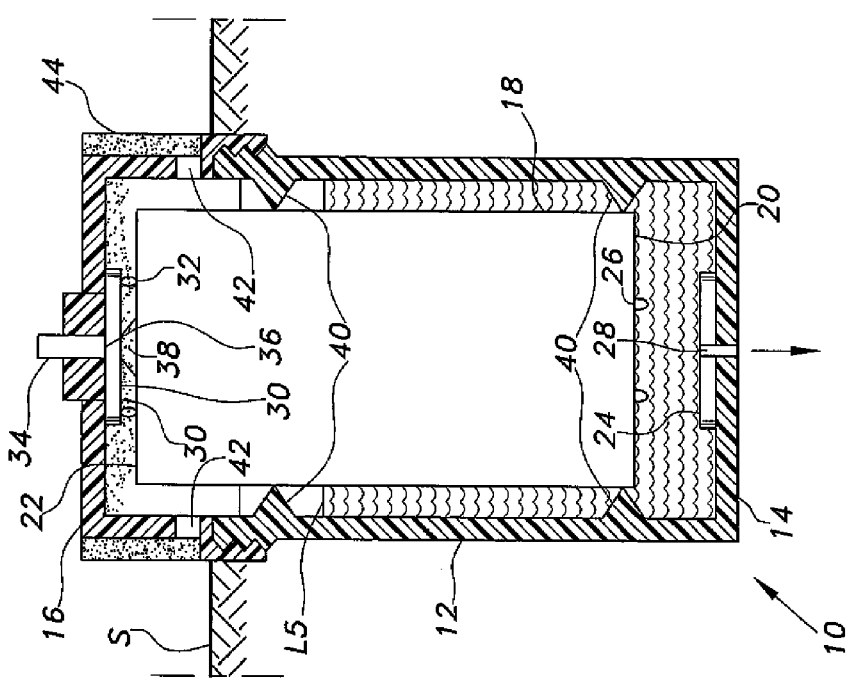

AUTOMATIC WATERING DEVICE FOR PLANTS

BACKGROUND OF THE INVENTION

1. Field of the Invention

The present invention relates to automated devices, and particularly to an automatic watering device for plants that is installed in the soil of a potted plant or the like. The device is particularly well suited for automatically watering small household plants and the like.

2. Description of the Related Art

Many, if not most, households have one or more decorative plants, and such plants are also popular additions to the work environment in many offices and other workplaces. While such plants are generally attractive and add an aura of calm and peace to the environment, they do require periodic care and maintenance. A universal characteristic of all decorative house plants is their need for periodic watering to maintain their health. This is the most frequent need of most ornamental plants and the like. While many offices and workplaces arrange for periodic visits by professionals to care for their plants, most plants in private homes depend upon the attention of members of the household for their care and maintenance, including periodic watering.

While periodic watering may not be a major chore for most people, the relatively infrequent need and routine nature of the task makes it quite easy to forget. Even when the task is remembered, it is still possible to administer too much water, or perhaps another person has watered the plant recently and the second person is unaware of this. As a result, a number of different automatic devices have been developed in the past. Many, if not most, depend upon some form of electrical power to operate a clockwork mechanism or other device to dispense water and/or other materials on a regular basis without the need for further care by the owner of the plant. Such devices may work well, so long as they are also properly maintained and so long as electrical power is available. However, most of the devices developed in the past tend to be somewhat complex in comparison to the relatively simple task of providing water to a plant on a regular periodic basis.

Thus, an automatic watering device for plants solving the aforementioned problems is desired.

SUMMARY OF THE INVENTION

The automatic watering device for plants is adapted for installation within the soil or earth of a potted houseplant or the like. The device comprises an outer chamber having a sealed float therein. The outer chamber and float are preferably formed of plastic to preclude potential corrosion. The outer chamber and float may be cylindrical in form, or may have some other configuration. The outer chamber has a calibrated orifice at its lower end, and a water inlet at its opposite upper end. The float has ferrous metal contacts at its upper and lower ends. The outer chamber has corresponding magnets within its upper and lower ends. The float also has a protruding valve extending from its upper end. The valve seats in a valve seat at the water inlet within the upper end of the outer chamber when the float is lifted. The outer chamber, float, magnets, contacts, and valve assembly are preferably mutually concentric, thus eliminating any concern for orientation of the device during installation.

The device is placed in the soil or earth of the plant pot or container with its upper end exposed above the level of the soil, and a steady water supply is connected to the upper inlet of the outer chamber. At this point the float has no buoyancy, as there is no water in the chamber. The float is thus magnetically secured to the bottom of the chamber. As the water flows into the chamber, water will seep from the calibrated orifice in the bottom of the chamber. The water level will also rise in the chamber, but the magnetic attraction of the lower magnet retains the float until the water level nearly fills the chamber. When this occurs, water flows from the overflow passages in the uppermost portion of the chamber to irrigate the upper surface of the soil in which the device is installed.

As the water continues to rise within the chamber, the magnetic attraction of the lower magnet to the bottom of the float is overcome by the increased buoyancy of the float, and the float rises to shut off the incoming water flow. The valve atop the float seats in the valve seat at the upper water inlet. Water continues to seep from the calibrated orifice at the bottom of the chamber to maintain a small but constant water supply to the roots of the plant. As the water level within the chamber drops, excess water on the surface of the soil flows back into the chamber through the overflow passages in the upper portion of the chamber. A filter (e.g., porous foam, etc.) may be placed about the overflow passages to prevent contamination of the interior of the device. Eventually, the water level drops to a point where the upper magnet can no longer hold the weight of the float against the water pressure being against the valve, and the float drops to open the upper inlet valve once again to repeat the above-described cycle.

These and other features of the present invention will become readily apparent upon further review of the following specification and drawings.

BRIEF DESCRIPTION OF THE DRAWINGS

FIG. 2A is an elevation view in section of the automatic watering device for plants according to the present invention, wherein the water level is relatively low and the internal float is lowered.

FIG. 2B is an elevation view in section of the automatic watering device for plants of FIG. 2A, wherein the water level has risen to the point of overflow with the internal float remaining lowered.

FIG. 2E is an elevation view in section of the automatic watering device for plants of FIGS. 2A through 2D, shown with the water level receding due to the raised internal float shutting off the incoming water flow.

FIG. 2F is an elevation view in section of the automatic watering device for plants of FIGS. 2A through 2E, shown with the water level continuing to recede due to the raised internal float shutting off the incoming water flow.

Similar reference characters denote corresponding features consistently throughout the attached drawings.

DETAILED DESCRIPTION OF THE PREFERRED EMBODIMENTS

The automatic watering device for plants is a relatively small assembly that is adapted for placement within the soil of a potted plant or the like, e.g., a decorative household plant. A hole is formed in the soil of the plant container, and the automatic watering device is placed in the hole with the upper end of the device extending slightly above the surface of the soil. A water supply is connected to the top of the device, and the device distributes water to the plant(s) within the container at a slow, predetermined rate.

Figure 1:
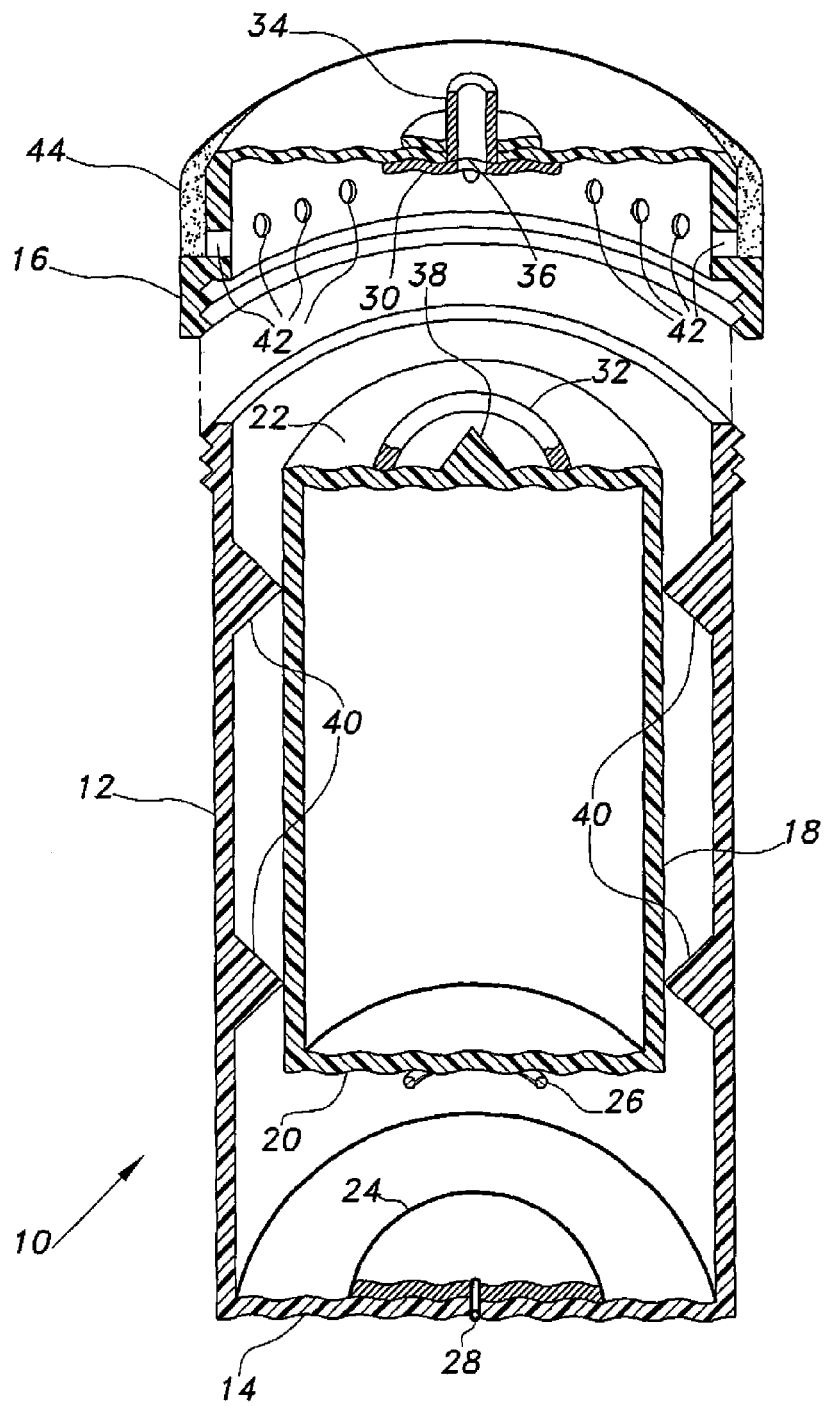
FIG. 1 is an exploded perspective view in section of an automatic watering device for plants according to the present invention, illustrating various internal details thereof.

FIG. 1 of the drawings provides an exploded perspective view in section of the automatic watering device for plants 10. The device 10 includes a hollow outer chamber 12 preferably formed of plastic and having a lower end 14 and an opposite upper end 16. The upper end 16 may be removably attached to the lower end 14 of the chamber 12, e.g., by threaded attachment as shown, or by other conventional means. Alternatively, the upper end 16 may be permanently attached or sealed to the body of the chamber 12 after the internal components of the chamber have been installed therein, e.g., by a suitable adhesive fusing the two components together, etc.

The outer chamber 12 contains a sealed float 18 disposed concentrically therein. The float also preferably is formed of plastic in order to obviate corrosion. The outer chamber 12 and the internal float 18 may be cylindrical, as shown in FIG. 1, or may alternatively have any other suitable configuration. The float 18 has a lower end 20 and an opposite upper end 22. The float 18 rises and sinks within the outer chamber 12 according to the water level within the chamber 12, which is controlled by the level of the float 18 therein and the outflow of water from the chamber 12. A lower magnet 24 is installed concentrically upon the lower end 14 within the chamber 12. The lower end 20 of the float 18 has a magnetically attractive ferrous metal contact ring 26 or catch plate installed concentrically thereon. The float 18 is thus secured to the bottom of the chamber 12 until the water in the chamber 12 rises to a level sufficient for the float 18 to become sufficiently buoyant to break the magnetic attraction of the metal contact ring 26 to the lower magnet 24, allowing the float 18 to rise. The lower magnet 24 and the lower end 14 of the chamber 12 have a calibrated orifice 28 formed therethrough to allow water to flow from within the chamber 12 into the soil at a slow, predetermined rate.

The upper end 16 of the chamber 12 has an upper magnet 30 installed concentrically therein. The upper end 22 of the float 18 has a magnetically attractive ferrous metal upper contact ring 32 or catch plate installed concentrically thereon. The upper magnet 30 and corresponding upper metal contact ring 32 function in a similar manner as the lower magnet 24 and lower metal contact ring 26, i.e., they serve to retain the float 18 against the upper end 16 of the chamber 12 until the water level drops sufficiently for the weight of the float 18 to overcome the magnetic attraction of the upper magnet 30 and upper metal contact ring 32 to allow the float 18 to drop.

The upper end 16 of the chamber 12 includes a water inlet 34 disposed concentrically therethrough. The end of the inlet 34 terminates within the upper end 16 of the chamber 12, the end of the inlet 34 defining a valve seat 36. The upper end 22 of the float 18 has a water shutoff valve 38 protruding upwardly therefrom. The shutoff valve 38 seats in the valve seat 36 to stop water flow through the inlet 34 when the float 18 is secured at its maximum height in the chamber 12 by the upper magnet 30 and upper metal contact ring 32. The float 18 is retained concentrically within the larger volume of the chamber 12 by a plurality of float guides 40 that protrude inwardly from the wall of the outer chamber 12 to fit closely against the side of the float 18 as it moves up and down within the chamber 12, thus assuring that the valve 38 properly seats within the valve seat 36 when the float 18 is raised.

The calibrated orifice 28 in the lower end 14 of the chamber 12 is configured to allow water to seep therefrom at a very slow rate in order to avoid overwatering the plant. Water inflow through the water inlet 34 is at a much faster rate when the float 18 is at its lower level. Accordingly, water will fill the chamber volume that is not occupied by the float 18, when the float 18 is at the bottom of the chamber 12. The float buoyancy and magnetic attraction of the lower metal contact 26 to the lower magnet 24 are carefully determined to hold the float 18 to the bottom of the chamber 12, even though the water level may reach the upper end 16 of the chamber 12. Accordingly, the upper end 16 of the chamber 12 includes at least one, and preferably a plurality of overflow ports or passages 42 disposed peripherally therearound. In the event that the water level rises into the upper end 16 of the chamber 12 without lifting the float 18 to shut off the water inflow, the water may flow out from the overflow passages 42 and over the surface of the soil in which the automatic watering device 10 is buried. (The upper end 16 of the device remains above the soil, as noted further above). Once the water level rises within the chamber 12 sufficiently to raise the float 18 and shut off the incoming water by closing the valve 38, residual water on the surface of the soil may flow back in through the overflow passages 42 as the water level within the chamber 12 slowly decreases due to the slow outflow from the calibrated orifice 28. A filter 44, e.g., an open cell foam material, may be provided about the upper end 16 of the chamber 12 to cover the overflow passages 42 and prevent contamination from the soil flowing into the interior of the chamber 12 as water flows back through the overflow passages 42.

FIGS. 2A through 2F illustrate sequentially the operation of the automatic watering device for plants 10. The device 10 is initially partially buried in the soil S of the plant container, so that the upper end 16 of the chamber 12 and the overflow passages 42 and filter 44 remain above the level of the soil S. It will be noted that the chamber 12, the float 18, the lower magnet 24, the calibrated orifice 28, the upper magnet 30, the water inlet 34 and valve seat 36, the lower ferrous metal contact 26, the upper ferrous metal contact 32, and the water shutoff valve 36 are all mutually concentric. This enables the device 10 to be placed in the soil S of the plant pot or container in any orientation about its vertical axis, so long as it is oriented as shown in the drawings, i.e., with the upper end 16 upward and exposed above the level of the soil S in the container.

FIG. 2A provides a cross-sectional view of the automatic watering device for plants 10 wherein the water level L1 is at a very low level within the device. The resulting buoyancy is insufficient to support the float 18, and the float 18 has separated from the upper magnet 30 to attach to the lower magnet 24 by magnetic attraction of the lower metal contact ring 26. As the contact between the metal ring 26 and magnet 24 is not a perfect seal, water continues to seep between the two components 24 and 26 to flow from the calibrated orifice 28, so long as any water remains within the bottom of the chamber 12, as shown by the outflow arrow extending from the orifice 28.

However, water will continue to flow into the chamber 12 through the inlet 34 and open valve seat 36 and valve 38 when the float 18 is lowered. As the water inflow is at a greater rate than the water outflow through the orifice 28, the portion of the chamber volume not filled by the float 18 will fill with water, generally as shown in FIG. 2B of the drawings. In FIG. 2B, the water level is actually shown slightly above the bottom edges of the overflow passages 42, so that the water flows out onto the surface of the soil S. However, the float 18 remains secured to the bottom 14 of the chamber 12 due to the magnetic attraction of the lower metal contact ring 26 to the lower magnet 24. Although the buoyancy of the float 18 is sufficient to lift the float 18 in the chamber 12, the additive forces of the float weight and magnetic attraction of the magnet 24 and contact 26 are sufficient to hold the float 18 to the bottom 14 of the chamber 12.

Figure 2C:
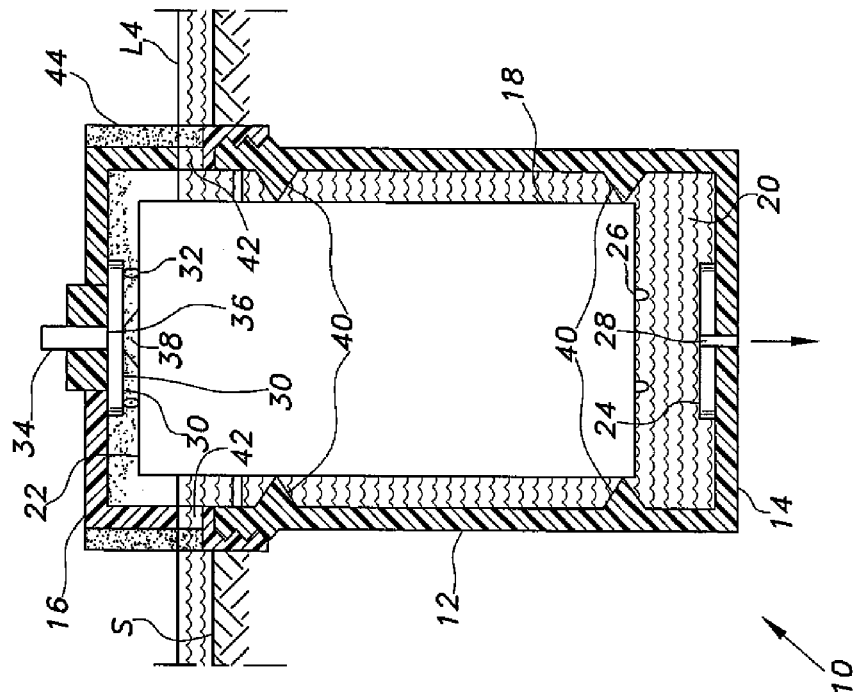
FIG. 2C is an elevation view in section of the automatic watering device for plants of FIGS. 2A and 2B, wherein the water level is shown higher than that in FIG. 2B with the internal float remaining lowered.

FIG. 2C depicts a condition quite similar to that of FIG. 2B, but the continued inflow of water through the inlet 34 and open valve seat 36 has resulted in the water flowing out through the overflow passages 42 to the extent that the water level L3 has risen outside the device 10 to essentially uniformly cover the soil S. At this point, the water level L3 within the chamber 12 is nearly sufficient to provide sufficient buoyancy to the float 18 to break the magnetic attraction between the lower magnet 24 and the lower contact 26.

Figure 2D:
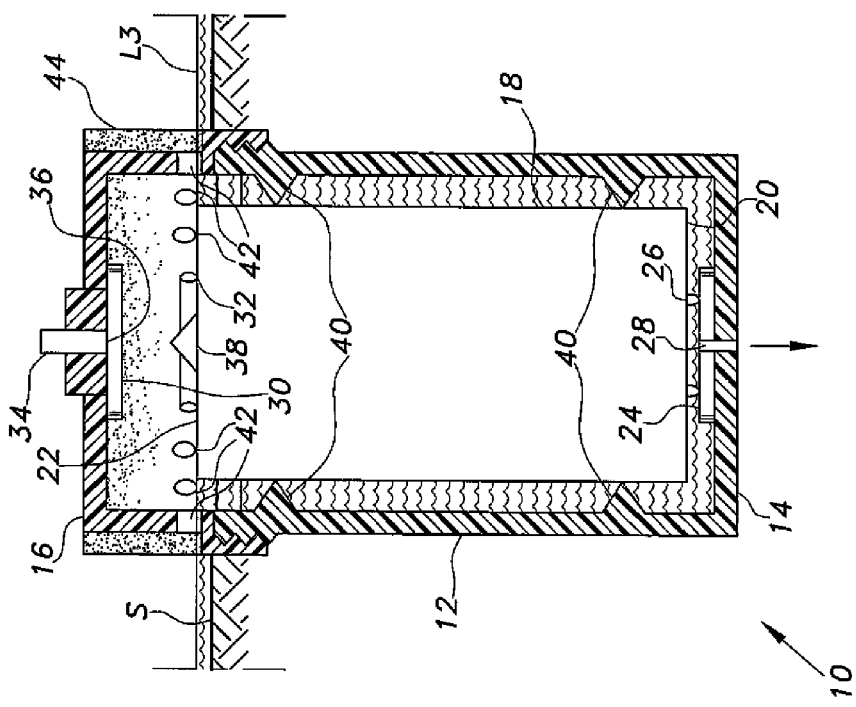
FIG. 2D is an elevation view in section of the automatic watering device for plants of FIGS. 2A through 2C, wherein the buoyancy of the internal float has caused it to lift and shut off the incoming water flow.

In FIG. 2D, the water level L4 has risen slightly higher. The increased buoyancy of the float 18 is now sufficient to break the magnetic attraction between the lower magnet 24 and the lower contact 26. The float 18 rises to the upper end 16 of the chamber 12, where the upper metal contact ring 32 magnetically attaches to the upper magnet 30 within the upper end 16 of the chamber 12. This causes the valve 38 to seat in the valve seat 36, thereby shutting off the water inflow from the inlet 34. However, water will continue to flow slowly from the calibrated orifice 28 through the bottom 14 of the chamber 12.

It will be seen in FIG. 2E that the water level L5 has receded within the chamber 12 to a level somewhat below the overflow passages 42. The water that had flowed out of the overflow passages during the earlier portion of the cycle of operation, as shown in FIGS. 2C and 2D, has either (a) flowed back into the chamber 12 through the overflow passages 42 and their filter 44, (b) drained through the soil S, or (c) evaporated, leaving the upper level of the soil S once again exposed to the air. The float 18 remains in its raised position to hold the valve 38 against the valve seat 36 due to its remaining buoyancy and the magnetic attachment of the upper metal contact ring 32 to the upper magnet 30. Thus, the only water being emitted by the device 10 is through the calibrated orifice 28 in the bottom 14 of the chamber 12. The calibrated orifice 28 emits water at a slow but constant rate during the entire operation of the device 10, so long as any water remains within the bottom of the chamber 12.

In FIG. 2F, the water level L6 has receded further inside the chamber 12 to a level near the bottom 14 of the chamber. At this point the weight of the float 18 alone would be sufficient for it to overcome the decreased buoyancy provided by the lower water level L6, and sink to the bottom 14 of the chamber 12. However, the slight buoyancy provided by the water level L6 in the chamber 12, in combination with the magnetic attraction of the upper metal contact 32 to the upper magnet 30, is sufficient to retain the float 18 in its uppermost position and keep the valve inlet 36 closed to prevent water inflow.

As the water level within the chamber 12 continues to drop as water slowly seeps from the calibrated orifice 28, the water level will eventually return to a level approximating the level L1 of FIG. 2A. At this point, the decreased buoyancy of the float 18, along with the water pressure developed at the valve 36, is sufficient to overcome the magnetic attraction of the upper magnet 30 and upper contact 32. When this occurs, the float 18 drops to the bottom of the chamber 12, where the lower metal contact ring 26 attaches magnetically to the lower magnet 24 to continue the cycle.

It will be seen that the duration of the above-described cycle will be dependent upon various factors, not the least of which is the rate of flow from the calibrated orifice 28. Accordingly, the orifice 28 may be made to be adjusted, if so desired. A conventional needle valve or the like, not shown, may be provided for adjustment if desired. This will enable the users of the automatic watering device for plants 10 to adjust the outflow as desired to adjust for the volume of soil within the plant container, the amount of water required by the plant(s) in the container, the rate of inflow of water through the water inlet 34 when the valve 38 and valve seat 36 are open, the rate of evaporation from the soil, and other factors. Once properly adjusted, the automatic watering device for plants 10 will allow the user of the device to eliminate frequent watering chores from his or her daily or weekly routine, freeing up time for other matters and allowing the person to enjoy their plants without concern for frequent maintenance.

It is to be understood that the present invention is not limited to the embodiments described above, but encompasses any and all embodiments within the scope of the following claims.

I claim:

1. An automatic watering device for plants, comprising:
 a hollow chamber having a lower end and an upper end opposite the lower end, the chamber being adapted for placement within a plant container;
 wherein the plant container has soil therein, the chamber being disposed in the soil;
 a sealed float disposed within the chamber, the float having a lower end and an upper end opposite the lower end;
 a lower magnet disposed within the lower end of the chamber, the lower end of the chamber and the lower magnet further having an orifice disposed therethrough;
 an upper magnet disposed within the upper end of the chamber;
 a water inlet and a valve seat disposed through the upper end of the chamber;
 a lower ferrous metal contact disposed upon the lower end of the float;
 an upper ferrous metal contact disposed upon the upper end of the float; and
 a water shutoff valve protruding from the upper end of the float, the shutoff valve engaging the valve seat of the upper end of the chamber when the upper ferrous metal contact of the float is magnetically secured to the upper magnet of the chamber.

2. The automatic watering device for plants according to claim 1, wherein the upper end of the chamber has at least one overflow passage disposed therethrough.

3. The automatic watering device for plants according to claim 2, further comprising a filter disposed about the upper end of the chamber adjacent the overflow passage.

4. The automatic watering device for plants according to claim 1 wherein the chamber, the float, the lower magnet, the orifice, the upper magnet, the water inlet and valve seat, the lower ferrous metal contact, the upper ferrous metal contact, and the water shutoff valve are all mutually concentric.

5. The automatic watering device for plants according to claim 1, further comprising a plurality of float guides disposed within the chamber.

6. The automatic watering device for plants according to claim 1, wherein the chamber and the float are cylindrical.

7. The automatic watering device for plants according to claim 1, wherein the chamber and the float are formed of plastic.

8. An automatic watering device for plants, comprising:
 a hollow chamber having a lower end and an upper end opposite the lower end, the chamber being adapted for placement within a portion of soil of a plant container, the upper end of the chamber having a water inlet and a valve seat and at least one overflow passage disposed therethrough, the lower end of the chamber having an orifice disposed therethrough;

a sealed float disposed within the chamber, the float having a lower end and an upper end opposite the lower end; and a water shutoff valve protruding from the upper end of the float, the shutoff valve engaging the valve seat of the upper end of the chamber.

9. The automatic watering device for plants according to claim 8, further comprising:

a lower magnet disposed at the lower end of the chamber, the lower magnet having an orifice disposed therethrough and concentric with the calibrated orifice of the lower end of the chamber;

an upper magnet disposed at the upper end of the chamber;

a lower ferrous metal contact disposed upon the lower end of the float;

an upper ferrous metal contact disposed upon the upper end of the float, the shutoff valve of the upper end of the float engaging the valve seat of the upper end of the chamber when the upper ferrous metal contact of the float is magnetically secured to the upper magnet of the chamber.

10. The automatic watering device for plants according to claim 9 wherein the chamber, the float, the lower magnet, each orifice, the upper magnet, the water inlet and valve seat, the lower ferrous metal contact, the upper ferrous metal contact, and the water shutoff valve are all mutually concentric.

11. The automatic watering device for plants according to claim 8, further comprising a filter disposed about the upper end of the chamber adjacent the at least one overflow passage.

12. The automatic watering device for plants according to claim 8, further comprising a plurality of float guides disposed within the chamber.

13. The automatic watering device for plants according to claim 8, wherein the chamber and the float are cylindrical.

14. The automatic watering device for plants according to claim 8, wherein the chamber and the float are formed of plastic.

15. An automatic watering device for plants, comprising:

a hollow chamber having a lower end and an upper end opposite the lower end, the chamber being adapted for placement within a plant container having soil therein, the upper end defining a valve seat, and the lower end of the chamber having calibrated an orifice disposed concentrically therethrough;

a sealed float disposed concentrically within the chamber, the float having a lower end and an upper end opposite the lower end;

and a water shutoff valve protruding concentrically from the upper end of the float, the shutoff valve engaging the valve seat of the upper end of the chamber.

16. The automatic watering device for plants according to claim 15, further comprising:

a lower magnet disposed concentrically upon the lower end of the chamber, the lower magnet having an orifice disposed therethrough concentric with the orifice of the lower end of the chamber;

an upper magnet disposed concentrically upon the upper end of the chamber;

a lower ferrous metal contact disposed concentrically upon the lower end of the float;

an upper ferrous metal contact disposed concentrically upon the upper end of the float, the shutoff valve of the upper end of the float engaging the valve seat of the upper end of the chamber when the upper ferrous metal contact of the float is magnetically secured to the upper magnet of the chamber.

17. The automatic watering device for plants according to claim 15, wherein the upper end of the chamber has at least one overflow passage disposed therethrough.

18. The automatic watering device for plants according to claim 17 further comprising a filter disposed about the upper end of the chamber adjacent the at least one overflow passage.

19. The automatic watering device for plants according to claim 15, further comprising a plurality of float guides disposed within the chamber.

20. The automatic watering device for plants according to claim 15, wherein:

the chamber and the float are cylindrical; and the chamber and the float are formed of plastic.

\* \* \* \* \*